United States Patent [19]

Sekmakas et al.

[11] 3,990,921

[45] Nov. 9, 1976

[54] METHOD OF COATING WITH LOW TEMPERATURE CURING CORROSION RESISTANT POLYURETHANE COATINGS

[75] Inventors: Kazys Sekmakas, Chicago; Paul Petrovich, Addison, both of Ill.

[73] Assignee: DeSoto, Inc., Des Plaines, Ill.

[22] Filed: July 24, 1975

[21] Appl. No.: 598,854

Related U.S. Application Data

[62] Division of Ser. No. 462,564, April 19, 1974, Pat. No. 3,933,760.

[52] U.S. Cl. .................... 148/6.15 R; 148/6.2; 427/27; 427/379; 427/388 R; 428/457; 428/461; 428/463
[51] Int. Cl.² .................... C23F 7/10; B05D 7/14
[58] Field of Search .............. 148/6.15 R, 6.2; 427/27, 379, 388 C, 388 D; 428/457, 461, 463; 260/77.5 CR, 77.5 AT

[56] References Cited
UNITED STATES PATENTS

| | | | |
|---|---|---|---|
| 3,245,941 | 4/1966 | Mayer et al. | 260/77.5 CR |
| 3,286,757 | 11/1966 | Thomas | 427/388 A |
| 3,376,252 | 4/1968 | Peiser et al. | 260/77.5 CR |
| 3,893,977 | 7/1975 | Wingler | 260/77.5 CR |
| 3,919,351 | 11/1975 | Chang et al. | 260/77.5 CR |
| 3,925,582 | 12/1975 | Sample et al. | 427/379 |

*Primary Examiner*—Harry J. Gwinnell
*Attorney, Agent, or Firm*—Dressler, Goldsmith, Clement, Gordon, & Shore, Ltd.

[57] ABSTRACT

A low temperature curing polyurethane coating system is provided which enables the deposition of adherent corrosion resistant coatings having a desirable balance of hardness and flexibility by using a mixture of a solution copolymer of from 55–85% styrene with the balance of the copolymer consisting essentially of monoethylenically unsaturated hydroxy functional monomer, the copolymer being in solution in inert organic solvent, and an organic polyisocyanate. The polyisocyanate is kept separate from the copolymer solution until the desired liquid mixture is formed and used. Steel substrates coated with this coating system are cured without exceeding 250° F.

9 Claims, No Drawings

METHOD OF COATING WITH LOW TEMPERATURE CURING CORROSION RESISTANT POLYURETHANE COATINGS

This is a division of application Ser. No. 462,564, filed Apr. 19, 1974, now U.S. Pat. No. 3,933,760.

The present invention relates to low temperature curing two-package polyurethane coatings adapted to deposit hard, flexible and corrosion resistant adherent films on steel surfaces. The invention includes the pretreatment of the steel to maximize adhesion.

It is known to provide two component coatings in which an organic polyisocyanate, on the one hand, is combined with an hydroxyl bearing resin, on the other hand. The mixture reacts at low temperature and can be applied before the reaction has proceeded to thicken the mixture excessively. The hydroxyl bearing resin is usually a polyester or polyether. The reaction produces a polyurethane, and it has the advantage that very little energy is required.

While these two component coating systems have many favorable attributes, they have not been well received by the appliance industry because adhesion to the steel substrate has been inadequate and the high corrosion resistance demanded by this industry has not been present. Corrosion resistance is used herein generically to embrace resistance to chemical attack which may be evidenced by inadequate resistance to detergents, salt spray, humidity, or staining.

As a result, and to provide coatings having the required resistance to chemical attack, the appliance industry has employed two coat systems, involving the application and separate baking at temperatures of at least about 300°–350° F. of a primer coat and a top coat. In the actual practice with which we are most familiar, the primer is baked 20 minutes in a 425° F. oven, and the topcoat is baked 20 minutes in an oven maintained at a temperature of from 350°–400° F. depending on the topcoat used. This requires separate coating lines, each having its own lengthy oven maintained at the high temperatures referred to.

Thus, the art has faced a dilemma. The properties needed have been available, but the cost has been high, and so has the curing energy requirement. On the other hand, the low energy curing one package polyurethane systems have not provided the needed properties.

The art has also been aware of the properties which normally flow from the selection of particular monomers. Thus, styrene has been avoided in thermosetting coatings which must be subjected to the elements, methyl methacrylate being chosen instead because of its superior properties, and this despite the fact that for many years styrene has been more available, and at lower cost. It is of interest to note that this availability and cost relationship do not prevail at the present time. Moreover, and regardless of which of these monomers is selected, the polymers made from them were unduly brittle unless a flexibilizing monomer was employed to provide an internal plasticizing action.

Curiously, in this invention, styrene is required to be used in large amount, and its replacement by methyl methacrylate or the presence of any significant amount of flexibilizing monomer in the copolymer function to degrade the high level of corrosion resistance which is essential.

In accordance with this invention, a solution copolymer is employed which contains from 55–85% of styrene, preferably from 65–80% of styrene, and the balance of the copolymer consists essentially of monoethylenically unsaturated hydroxy functional monomer. This copolymer, in organic solvent solution, constitutes one package of a two package system, the second package of which is an organic polyisocyanate.

It has been discovered that the use of these styrene-based hydroxy functional solution copolymers in the low temperature curing polyurethane two package systems described, unexpectedly yields excellent detergent, salt spray, and stain resistance. Moreover, the cure is rapid, and the cured product is hard and flexible, and has satisfactory impact resistance despite the very high level of hard and brittle styrene monomer, and the absence of any flexibilizing monomer. These well balanced properties in a low temperature curing system represent a significant advance in the art.

Replacement of styrene with methyl methacrylate causes a dramatic reduction in corrosion, detergent, salt spray, and stain resistance properties. Thus, the system which the art would think to be the better one, is unexpectedly markedly inferior and unsatisfactory for use on refrigerators, and laundry equipment.

The organic polyisocyanates are useful in this invention as a class, it being preferred to employ at least a stoichiometric proportion thereof, most preferably a 5–40% stoichiometric excess. Diisocyanates and polyisocyanates of higher functionality are fully useful, the latter being preferred. The conventional toluene diisocyanates will illustrate the most common useful material, but aliphatic polyisocyanates, such as hexamethylene diisocyanate, are preferred. Higher molecular weight polyisocyanates having an isocyanate functionality of at least 3 are particularly preferred, such as adducts of diisocyanates with polyhydric alcohols, such as trimethylol propane. Particularly preferred is the reaction product of three moles of hexamethylene diisocyanate with one mole of water, which is a triisocyanate having the formula:

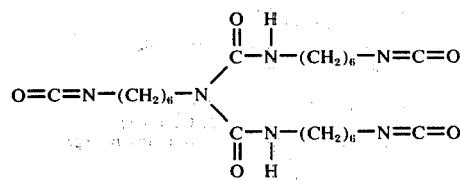

These polyisocyanates and also the solution copolymers are used in solvent solution, and this means that the solvent must be free of active hydrogen and free of water, as is well known.

Thus, the final mixture is a three component mix containing organic solvent, polyisocyanate, and solution copolymer. Other conventional materials may also be present, such as flow control agents, catalysts to speed the cure, pigments, fillers, soluble dyes, and the like, as is conventional.

Referring more particularly to the hydroxy functional copolymers which are used, these are solution copolymers which identifies copolymerization in organic solvent medium which produces an organic solvent soluble resin. The styrene component is critical as previously described. The hydroxy monomer is preferably an hydroxy alkyl acrylate, the alkyl group containing from 2–4 carbon atoms. Hydroxy ethyl acrylate is particularly preferred, and will be illustrated. It is noted in passing that the term hydroxyl is used in its conventional narrow connotation in which it identifies the alcoholic hydroxyl group, and no other group. Indeed, the hydroxyl group and the single ethylenic group are the only reactive groups contemplated in this monomer.

Other hydroxy monomers which may be used are simple adducts of an alkylene oxide containing 2–4 carbon atoms with an alpha,beta-monoethylenically unsaturated carboxylic acid. The oxides are illustrated by ethylene oxide, 1,2-propylene oxide, and 1,2-butylene oxide. The acids are illustrated by acrylic acid, methacrylic acid, crotonic acid, itaconic acid, maleic acid, etc. Thus, hydroxy propyl methacrylate, hydroxy ethyl crotonate, and hydroxy butyl maleate (the mono- or bis-ester) will further illustrate the class of useful monomers.

The solution copolymerization is wholly conventional, being normally carried out at reflux in the selected solvent in the presence of a free radical polymerization catalyst, such as benzoyl peroxide, t-butyl perbenzoate, or azobisisobutyronitrile.

The invention is illustrated in the following examples.

EXAMPLE 1

Charge 400 parts 2-ethoxy ethanol acetate and 400 parts xylol to reactor and heat to 130° C. Premix 1070 parts styrene, 340 parts hydroxy ethyl acrylate, and 20 parts t-butyl perbenzoate and add to reactor over a 3 hour period, while maintaining reactor at 130° C. Hold 1 hour and add 4 parts t-butyl perbenzoate. Hold 2 hours and add 200 parts 2-ethoxy ethanol acetate and 200 parts xylol. The hydroxyl number of the product was 125.

The resin of Example 1 was evaluated in a pigmented low energy curing coating as follows:

| Copolymer Solution Component (pigmented) — Parts by weight | |
|---|---|
| 14.47 | Solution of Example 1 |
| 5.36 | 2-Ethoxy ethanol acetate |
| 32.15 | Titanium dioxide |
| | Grind pigment dispersion, then add: |
| 31.48 | Solution of Example 1 |
| 13.98 | Butyl acetate |
| 2.14 | Dibutyl tin dilaurate catalyst (1% solution in methyl ethyl ketone) |
| 0.43 | Silicone solution flow and anticratering agent (optional – see Note 1) |
| | Solids by Weight 57.4% |
| | Weight per gallon 10.75 |
| Isocyanate Solution Component — Parts by Weight | |
| 53.28 | 75% solution of adduct of 3 moles hexamethylene diisocyanate with one mole of water in 1:1 weight ratio mixture of 2-ethoxy ethanol acetate and xylol (see note 2) |
| 38.29 | 2-Ethoxy ethanol acetate |
| 8.43 | Toluene |
| Note 1 — | Dow Corning 230 fluid having a viscosity at 77° F. of 1400 centistokes and an open cup flash point of 500° F. may be used. |
| Note 2 — | Desmodur N-75, a product of Mobay Chemical Company may be used. |
| | Percent solids by weight: 40.0% |

For application by electrostatic spray, the following ratio by volume of the separate components is used:
63.83 Copolymer Solution Component
9.41 Toluene (added to reduce viscosity for handling)
26.76 Isocyanate Solution Component Upon admixture, the two components form a solution which thickens gradually with time, but an adequate working period is available for hand spray. For electrostatic spray, the components are mixed on the way to the spray head. The mixture at a viscosity of 22 seconds measured at 65° F. in a No. 2 Zahn Cup is pumped at 400 cc per minute to an electrostatic disc applicator charged to 90 kilovolts and spinning at 3600 revolutions per minute. Electrostatic spray was carried out on grounded steel panels moving at 35 feet per minute past the spray disc at a distance of 13 inches. Atomization was excellent, and the deposited wet film showed no tendency to crater, bubble, or sag. The coated panels were baked briefly at low temperature (10 minutes in a 150° F. oven). The final film had a very good appearance, and a thickness of 1.0 mil. The cured panels were aged for 168 hours at room temperature during which period the coatings hardened from an F pencil hardness to a 2H hardness. The 60° gloss meter reading was 98 and the coatings were adequately flexible as indicated by passing the ⅛ inch conical mandrel test, and exhibiting a direct impact in excess of 40 inch pounds. The coatings were strongly adherent to the base, and satisfactorily abrasion resistant. Also, stain resistance and grease resistance were satisfactory.

Various panels were coated, and some of these provided superior properties, particularly in the areas of impact resistance and flexibility, on the other hand. Accordingly, and for most outstanding results in these categories, the steel should be prerinsed with a rinse solution containing trivalent chromium. It is only in this way that we have been able to pass 240 hours detergent testing in 1.0% synthetic detergent, and 500 hours in 5% salt spray.

In this invention, the steel substrate is cleaned with detergent and rinsed with water, and is then phosphated in conventional fashion with an aqueous solution of zinc or iron phosphate.* After rinsing with water, a chromate solution is applied. This solution is aqueous, and it contains trivalent chromium, either alone or together with hexavalent chromium. Parcolene 8 supplied by the Parker Company of Detroit, Michigan, may be used.

* Bonderite 40 supplied by the said Parker Company.

To more precisely identify the new contribution which has been made, there is presented to Table I which summarizes the manner in which composition changes are related to physical properties and corrosion resistance. Only the styrene-hydroxyethyl acrylate copolymer passes the severe corrosion and flexibility tests of the appliance industry, when utilized in a single coat (no primer) finish.

TABLE I

|  | Styrene Polymer | Acrylic Polymer | Styrene Acrylic Polymer | Commercial Polyester* |
|---|---|---|---|---|
| Styrene | 76% |  | 38% |  |
| Hydroxy Ethyl Acrylate | 24% | 25% | 25% |  |
| Ethyl Acrylate |  |  | 38% |  |
| Methyl Methacrylate |  | 76% |  |  |
| Polyester (Hydroxy Functional) |  |  |  | 100% |
| Humidity, 2000 hours | Pass | Fail | Fail | Fail |
| Detergent Resistance (hours) | Pass 240 | Fail 48 | Fail 48 | Fail 24 |
| 5% Salt Spray Resistance (hours) | Pass 500 | Fail 250 | Fail 250 | Fail 150 |
| Flexibility (1/4" Mandrel) | Pass | Fail | Pass | Pass |

TABLE I-continued

|  | Styrene Polymer | Acrylic Polymer | Styrene Acrylic Polymer | Commercial Polyester* |
|---|---|---|---|---|
| Impact (inch/lbs.) | Pass 40 | Fail 40 | Pass 40 | Pass 40 |

*Mobay Chemical Company Polyester Desmophen-650

All of the above coatings were cured by baking 10 minutes at 150° F. followed by 168 hours of ageing at room temperature.

It will thus be evident that the liquid mixtures formed in this invention can be cured without exceeding 250° F., preferably without exceeding 200° F. Indeed, as little as 10 minutes in a 150° F. oven is adequate when followed by room temperature ageing for at least a day. With care, simple storage at room temperature will supply an adequate cure, though some heating is helpful to speed the development of a solid surface which is easier to handle in storage.

The invention is defined in the claims which follow.

We claim:

1. A method of providing an adherent corrosion resistant, hard and flexible coating on a steel substrate while minimizing the energy required to cure the coating comprising, mixing an organic solvent solution of organic polyisocyanate with an organic solvent solution of a solution copolymer of from 55–85% of styrene with the balance of the copolymer consisting essentially of monoethylenically unsaturated hydroxy functional monomer, the organic solvents in said solutions being inert and water free, and said solutions being proportional to provide a liquid mixture containing a stoichiometric excess of said polyisocyanate, coating said liquid mixture on a steel substrate, and then curing said coating without exceeding 250° F.

2. A method as recited in claim 1 in which the coating is baked at a temperature below 200° F. to solidify the coating, and the coating is then aged to complete the cure.

3. A method as recited in claim 1 in which said steel substrate is phosphated and then treated with an aqueous solution of trivalent chromium.

4. A method as recited in claim 1 in which said polyisocyanate is present in a sotichiometric excess of 5–40%.

5. A method as recited in claim 4 in which said polyisocyanate is an aliphatic polyisocyanate having an isocyanate functionality of at least 3.

6. A method as recited in claim 5 in which said polyisocyanate is an adduct of an aliphatic diisocyanate with a polyhydric alcohol containing at least 3 hydroxy groups.

7. A method as recited in claim 1 in which said hydroxy functional monomer is an hydroxy alkyl acrylate, the alkyl group containing from 2–4 carbon atoms.

8. A method as recited in claim 7 in which said hydroxy functional monomer is hydroxy ethyl acrylate.

9. A method as recited in claim 1 in which said styrene is present in an amount of from 65–80%, and the balance of said copolymer consists of adducts of an alkylene oxide containing 2–4 carbon atoms with an alpha,beta-monoethylenically unsaturated carboxylic acid.

* * * * *